United States Patent
Seshadri (10) Patent No.: US 8,430,750 B2
(45) Date of Patent: Apr. 30, 2013

(54) VIDEO GAMING DEVICE WITH IMAGE IDENTIFICATION

(75) Inventor: Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 295 days.

(21) Appl. No.: 12/627,894

(22) Filed: Nov. 30, 2009

(65) Prior Publication Data

US 2010/0075749 A1    Mar. 25, 2010

Related U.S. Application Data

(63) Continuation-in-part of application No. 12/137,143, filed on Jun. 11, 2008, and a continuation-in-part of application No. 12/125,154, filed on May 22, 2008.

(60) Provisional application No. 61/246,289, filed on Sep. 28, 2009.

(51) Int. Cl.
*A63F 9/24* (2006.01)

(52) U.S. Cl.
USPC ............................ 463/29; 31/32; 31/36

(58) Field of Classification Search ............ 463/29, 463/31, 32, 36
See application file for complete search history.

(56) References Cited

U.S. PATENT DOCUMENTS

| | | | |
|---|---|---|---|
| 4,807,183 A | 2/1989 | Kung | |
| 5,502,683 A | 3/1996 | Marchioro | |
| 5,754,948 A | 5/1998 | Metze | |
| 5,786,912 A | 7/1998 | Kartalopoulos | |
| 5,809,321 A | 9/1998 | Hansen | |
| 5,884,104 A | 3/1999 | Chase | |
| 5,943,427 A | 8/1999 | Massie et al. | |
| 6,182,203 B1 | 1/2001 | Simar | |
| 6,234,900 B1 * | 5/2001 | Cumbers | 463/29 |
| 6,438,622 B1 | 8/2002 | Haghighi et al. | |
| 6,500,070 B1 | 12/2002 | Tomizawa et al. | |
| 6,663,295 B2 | 12/2003 | Kami et al. | |
| 6,735,663 B2 | 5/2004 | Watts, Jr. et al. | |
| 6,735,708 B2 | 5/2004 | Watts, Jr. | |

(Continued)

FOREIGN PATENT DOCUMENTS

| | | |
|---|---|---|
| EP | 1499070 A2 | 1/2005 |
| WO | 2009002464 A2 | 12/2008 |

OTHER PUBLICATIONS

European Search Report ; EP Application No. 10010081, Jan. 14, 2011, 9 pages.

(Continued)

*Primary Examiner* — Melba Bumgarner
*Assistant Examiner* — Lawrence Galka
(74) *Attorney, Agent, or Firm* — Garlick & Markison; Kevin L. Smith (57) ABSTRACT

A video gaming device includes a processing module, a graphics processing module, and a video gaming object interface module. The processing module interprets a digital image(s) of a player to determine an identity of the player. When the identity of the player is determined, the processing module retrieves a user profile and generates video gaming menu data in accordance with at least one data element of the user profile. The graphics processing module renders a display image based on the video gaming menu. The video gaming object interface module receives a wireless menu selection signal and converts it into a menu selection signal.

10 Claims, 7 Drawing Sheets

U.S. PATENT DOCUMENTS

| | | | |
|---|---|---|---|
| 6,801,974 B1 | 10/2004 | Watts, Jr. et al. | |
| 6,816,925 B2 | 11/2004 | Watts, Jr. | |
| 7,065,326 B2 | 6/2006 | Lovberg | |
| 7,082,285 B2 | 7/2006 | Linde | |
| 7,149,837 B2 | 12/2006 | Watts, Jr. et al. | |
| 7,159,099 B2 | 1/2007 | Lucas | |
| 7,171,050 B2 | 1/2007 | Kim | |
| 7,197,584 B2 | 3/2007 | Huber et al. | |
| 7,218,143 B1 | 5/2007 | Young | |
| 7,257,093 B1 | 8/2007 | Witzke | |
| 7,330,702 B2 | 2/2008 | Chen et al. | |
| 7,406,062 B2 | 7/2008 | Hsu | |
| 7,444,393 B2 | 10/2008 | Chung | |
| 7,903,724 B2 | 3/2011 | Rofougaran | |
| 7,929,474 B2 | 4/2011 | Pettus | |
| 2002/0022521 A1* | 2/2002 | Idaka | 463/42 |
| 2002/0049806 A1 | 4/2002 | Gatz et al. | |
| 2002/0061012 A1 | 5/2002 | Thi | |
| 2002/0082082 A1* | 6/2002 | Stamper et al. | 463/32 |
| 2002/0107010 A1 | 8/2002 | Witte | |
| 2002/0164945 A1 | 11/2002 | Olsen | |
| 2003/0001882 A1 | 1/2003 | Macer et al. | |
| 2003/0017845 A1 | 1/2003 | Doviak | |
| 2003/0040284 A1 | 2/2003 | Sato | |
| 2003/0059022 A1 | 3/2003 | Nebiker | |
| 2003/0078071 A1 | 4/2003 | Uchiyama | |
| 2003/0083132 A1* | 5/2003 | Berg et al. | 463/40 |
| 2003/0112585 A1 | 6/2003 | Silvester | |
| 2003/0118192 A1 | 6/2003 | Sasaki | |
| 2003/0126335 A1 | 7/2003 | Silvester | |
| 2003/0128712 A1 | 7/2003 | Moriwaki | |
| 2003/0162503 A1 | 8/2003 | LeCren | |
| 2003/0172380 A1 | 9/2003 | Kikinis | |
| 2003/0221036 A1 | 11/2003 | Konetski | |
| 2004/0013278 A1 | 1/2004 | Yamada | |
| 2004/0054776 A1 | 3/2004 | Klotz | |
| 2004/0062308 A1 | 4/2004 | Kamosa | |
| 2004/0117442 A1 | 6/2004 | Thielen | |
| 2004/0123113 A1 | 6/2004 | Mathiassen et al. | |
| 2004/0153863 A1 | 8/2004 | Klotz | |
| 2004/0157559 A1 | 8/2004 | Sugikawa | |
| 2004/0174431 A1 | 9/2004 | Stienstra | |
| 2004/0203364 A1 | 10/2004 | Silvester | |
| 2004/0266336 A1 | 12/2004 | Patsiokas et al. | |
| 2005/0014468 A1 | 1/2005 | Salokannel | |
| 2005/0049049 A1* | 3/2005 | Griswold et al. | 463/46 |
| 2005/0060598 A1 | 3/2005 | Klotz | |
| 2005/0124307 A1 | 6/2005 | Ammar et al. | |
| 2005/0185364 A1 | 8/2005 | Bell | |
| 2005/0250531 A1 | 11/2005 | Takebe et al. | |
| 2006/0026348 A1 | 2/2006 | Wallace | |
| 2006/0035707 A1* | 2/2006 | Nguyen et al. | 463/29 |
| 2006/0038731 A1 | 2/2006 | Turner | |
| 2006/0046762 A1 | 3/2006 | Yoon et al. | |
| 2006/0085675 A1 | 4/2006 | Popell | |
| 2006/0101164 A1 | 5/2006 | Lee | |
| 2006/0148568 A1 | 7/2006 | Schultz et al. | |
| 2006/0164271 A1 | 7/2006 | Hirt | |
| 2006/0167784 A1 | 7/2006 | Hoffberg | |
| 2006/0176851 A1 | 8/2006 | Bennett | |
| 2006/0190691 A1 | 8/2006 | Chauve | |
| 2006/0203758 A1 | 9/2006 | Tee et al. | |
| 2006/0211479 A1* | 9/2006 | Walker et al. | 463/16 |
| 2006/0233389 A1 | 10/2006 | Mao et al. | |
| 2006/0239471 A1 | 10/2006 | Mao et al. | |
| 2006/0252470 A1 | 11/2006 | Seshadri | |
| 2006/0260546 A1 | 11/2006 | Usami | |
| 2006/0262026 A1 | 11/2006 | Gainey et al. | |
| 2006/0269004 A1 | 11/2006 | Ibrahim | |
| 2006/0274911 A1 | 12/2006 | Mao et al. | |
| 2006/0282635 A1 | 12/2006 | Mather | |
| 2007/0015558 A1 | 1/2007 | Zalewski et al. | |
| 2007/0038808 A1 | 2/2007 | Yim | |
| 2007/0147152 A1 | 6/2007 | Sekiguchi | |
| 2007/0155502 A1 | 7/2007 | Wu | |
| 2007/0160216 A1 | 7/2007 | Nicol et al. | |
| 2007/0167149 A1 | 7/2007 | Comstock | |
| 2007/0229270 A1 | 10/2007 | Rofougaran | |
| 2007/0239929 A1 | 10/2007 | Chen | |
| 2007/0268481 A1 | 11/2007 | Raskar et al. | |
| 2007/0298882 A1 | 12/2007 | Marks et al. | |
| 2008/0020843 A1 | 1/2008 | Wolinsky | |
| 2008/0028118 A1 | 1/2008 | Sayers et al. | |
| 2008/0032787 A1* | 2/2008 | Low et al. | 463/29 |
| 2008/0040541 A1 | 2/2008 | Brockmann | |
| 2008/0063236 A1 | 3/2008 | Ikenoue et al. | |
| 2008/0070516 A1 | 3/2008 | Lee | |
| 2008/0076406 A1 | 3/2008 | Chen | |
| 2008/0151847 A1 | 6/2008 | Abujbara | |
| 2008/0158222 A1* | 7/2008 | Li et al. | 345/418 |
| 2009/0006640 A1 | 1/2009 | Brouwer | |
| 2009/0198854 A1 | 8/2009 | Rofougaran | |
| 2009/0215533 A1* | 8/2009 | Zalewski et al. | 463/32 |
| 2010/0007665 A1* | 1/2010 | Smith et al. | 345/473 |
| 2010/0146199 A1 | 6/2010 | Shaeffer | |
| 2011/0118031 A1 | 5/2011 | Mao et al. | |

OTHER PUBLICATIONS

Bruce K Gale, "RF, Electrical, and Magnetic Microsystems," date unknown, 8 pages.

Dr. Lynn Fuller, "Microelectromechanical Systems (MEMs) Applications—Microphones,"Rochester Institute of Technology Microelectronic Engineering, Apr. 25, 2005, pp. 1-43.

Radio Control Adapter; IBM Technical Disclosure Bulletin NN86081337; IBM; Aug. 1986.

Xilinx Inc.: Spartan-3AN FPGA Family Data Sheet, DS557, Jun. 2, 2008, pp. 5.

Haworth, et al.; Public Security Screening for Metallic Objects with Millimetre-Wave Images; Heriot-Watt University; United Kingdom; pp. 1-4.

Elsadek, et al.; "A Compact 3-D Microwave Holographic Pointer System Using a Size Reduced Microstrip Planar Array"; Department of Electrical and Computer Engineering; University of California; pp. 1-5.

Elsadek, et al.; "Microstrip Multi-element Diversity Antenna Array for Three Dimensional Microwave Holographic Input Pointer (Holo3D)"; Department of Electrical and Computer Engineering; University of California; pp. 1-4.

E3 Wii Controller; Nintendo Wilmote; Technology Limitations; Xgaming, Inc.; pp. 1-5.

* cited by examiner

VIDEO GAMING DEVICE WITH IMAGE IDENTIFICATION

CROSS REFERENCE TO RELATED PATENTS

This invention claims priority under 35 USC §119(e) to a provisionally filed patent application having the same title as the present patent application, a filing date of Sep. 28, 2009, and an application number of 61/246,289, now expired.

This patent application is also claiming priority under 35 USC §120 as a continuation in part patent application of co-pending patent application entitled GAME DEVICE THAT GENERATES A DISPLAY WITH A SIMULATED BODY IMAGE AND METHODS FOR USE THEREWITH, having a filing date of Jun. 11, 2008, a Ser. No. 12/137,143, and co-pending patent application entitled VIDEO GAMING SYSTEM WITH POSITION AND MOTION TRACKING, having a filing date of May 22, 2008, a Ser. No. 12/125,154, now abandoned, all of which are incorporated herein by reference for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless systems and more particularly to video gaming wireless systems.

2. Description of Related Art

Current generation video gaming systems (e.g., a video game console, at least one video game controller, and a video game application or algorithm) allow their users to play DVDs, access the internet, as well as play video games using wireless controllers. Some video game systems provide accelerometer and/or infrared (IR) based motion tracking to enhance video game play.

While the trend of video gaming is to provide the user with an enhanced gaming experience by improving video graphics, improving audio processing, providing internet play, and providing basic motion tracking, there is substantial room for further enhancements. For example, current video gaming systems require a user to establish an account with the system entering data via the controller. The system stores the account information, but each time the user engages his or her system to play a video game, he or she must use the controller to communicate with the video game console to retrieve his or her account information. This process provides an opportunity for enhancement.

As another, most video games that provide on screen players use video graphic caricatures designed by the video game creator. Some video games allow the user to modify features of a caricature to make it more personal. As such, there is an opportunity to make video game caricatures more personal.

Therefore, a need exists for a video gaming device that enhances video game play.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
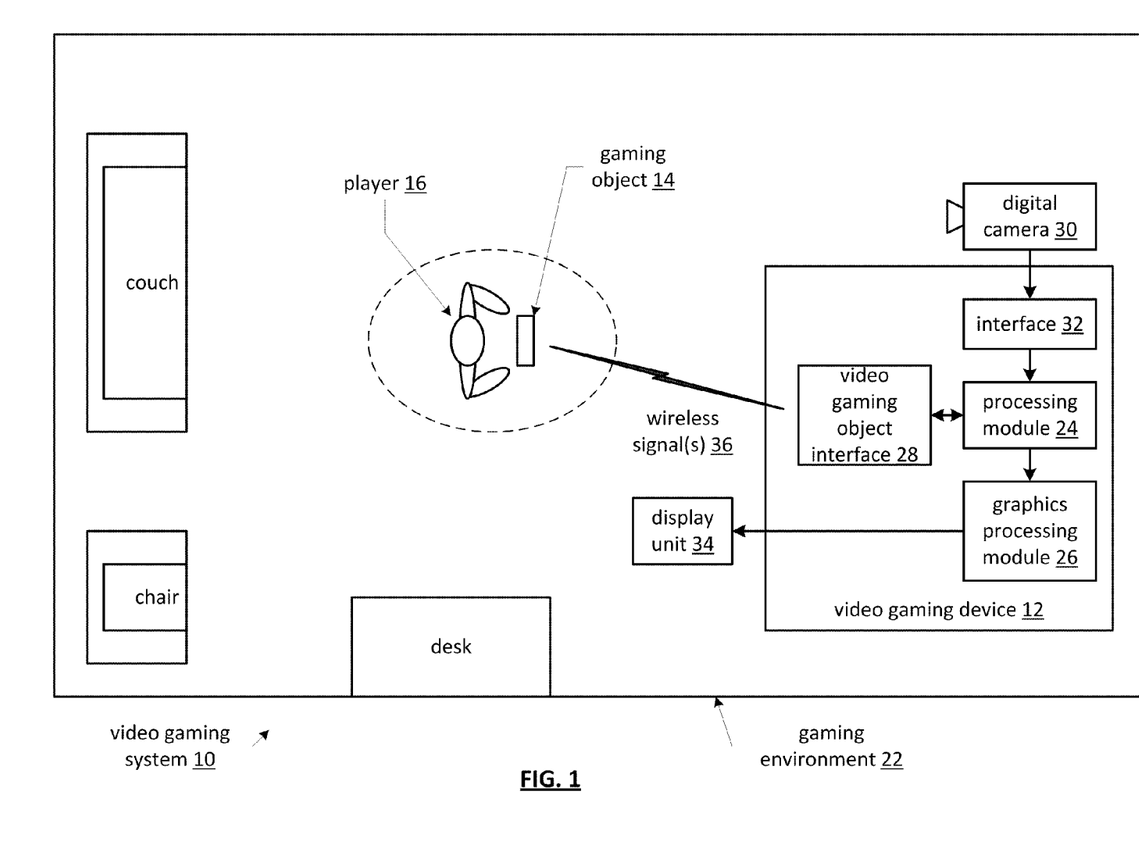
FIG. 1 is a schematic block diagram of an embodiment of a video gaming system in accordance with the present invention.

FIG. 1 is a schematic block diagram of an overhead view of an embodiment of a video gaming system 10 that includes a video gaming device 12 and at least one gaming object 14 associated with a video game player 16. The video gaming system 10 is within a gaming environment 22, which may be a room, portion of a room, and/or any other space where the gaming object 14 and the video gaming device 12 can be proximally co-located (e.g., airport terminal, on a bus, on an airplane, etc.).

The video gaming device 12 (which may be a standalone device, a video game console, or incorporated in a personal computer, laptop computer, handheld computing device, etc.) includes a processing module 24, a graphics processing module 26, a video gaming object interface 28, and an interface 32. The interface 32 couples the video gaming device 12 to at least one digital camera 32, which could be included in the video gaming device 12. The interface 32 may be a universal serial bus (USB), a Firewire interface, a Bluetooth interface, a WiFi interface, etc.

The processing module 24 and the graphics processing module 26 may be separate processing modules or a shared processing module. Such a processing module may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-10.

In general, the graphics processing module 26 renders data into pixel data (e.g., a display image) for display on a display unit 34 (e.g., monitor, television, LCD display panel, etc.). For instance, the graphics processing module 26 may perform calculations for three-dimensional graphics, geometric calculators for rotation, translation of vertices into different coordinate systems, programmable shading for manipulating vertices and textures, anti-aliasing, motion compensation, color space processing, digital video playback, etc.

In an example of operation, the digital camera 30 takes at least one digital picture of the video game player 16. This may occur when the player 16 enables the video gaming device 12, the player 16 provides a command via the gaming object 14, as a result of the digital camera periodically capturing digital images that are analyzed by the video gaming device 12, and/or as a result of the digital camera continuously (e.g., video recorder mode) capturing digital images that are analyzed by the video gaming device 12.

As the digital camera 30 captures digital images, it provides them to the processing module 24 via the interface. This may be done as the images are captures or the images may be stored and then forwarded to the processing module 24. The processing module 24 interprets the digital images (or at least one of them) to detect whether a player 16 is present in the digital image and, if so, attempts to determine an identity of the video game player 16.

When the processing module 24 is able to identify the video game player, the processing module 24 retrieve a user profile of the video game player based on his or her identity. The user profile includes various user data such as authentication data, access privileges, product registration data, and/or personal preference data. The processing module 24 then generates video gaming menu data in accordance with at least one data element of the user profile. For example, based the player's personal preferences, the processing module 24 creates a menu that includes system settings, favorite video games, etc.

The processing module 24 provides the video gaming menu data to the graphics processing module 26, which renders a display image based on the video gaming menu. The rendering may include two-dimensional processing, three-dimensional processing, and/or any other video graphics processing function.

If the player 16 desires to engage the video gaming device 12, he or she may provide a menu selection via the gaming object 14. In this instance, the gaming object 14 interprets the input it receives from the player 16 (which may be received via a keypad, one or more electro-mechanical switches, or buttons, voice recognition, etc.) and creates a corresponding wireless menu selection signal. The video gaming object interface module 28 receives the wireless menu selection signal and converts the wireless menu selection signal into a menu selection signal.

Alternatively, the gaming object 14 may provide a directed wireless signal at a graphics representation of a menu item. The video gaming object interface 28 detects the directed wireless signal as the wireless menu selection signal and determines which of the menu items the signal is indicating. The video gaming object interface 28 converts the wireless menu selection signal into a menu selection signal, e.g., generates a signal indicating the selected menu item.

In general, the gaming object 14 and the video gaming object interface module 28 communicate signals 36 (e.g., menu selection, video game inputs, video game feedback, video game control, user preference inputs, etc.) wirelessly. Accordingly, the gaming object 14 and the interface module 28 each include wireless communication transceivers, such as infrared transceivers, radio frequency transceivers, millimeter wave transceivers, acoustic wave transceivers or transducers, and/or a combination thereof.

Figure 2:
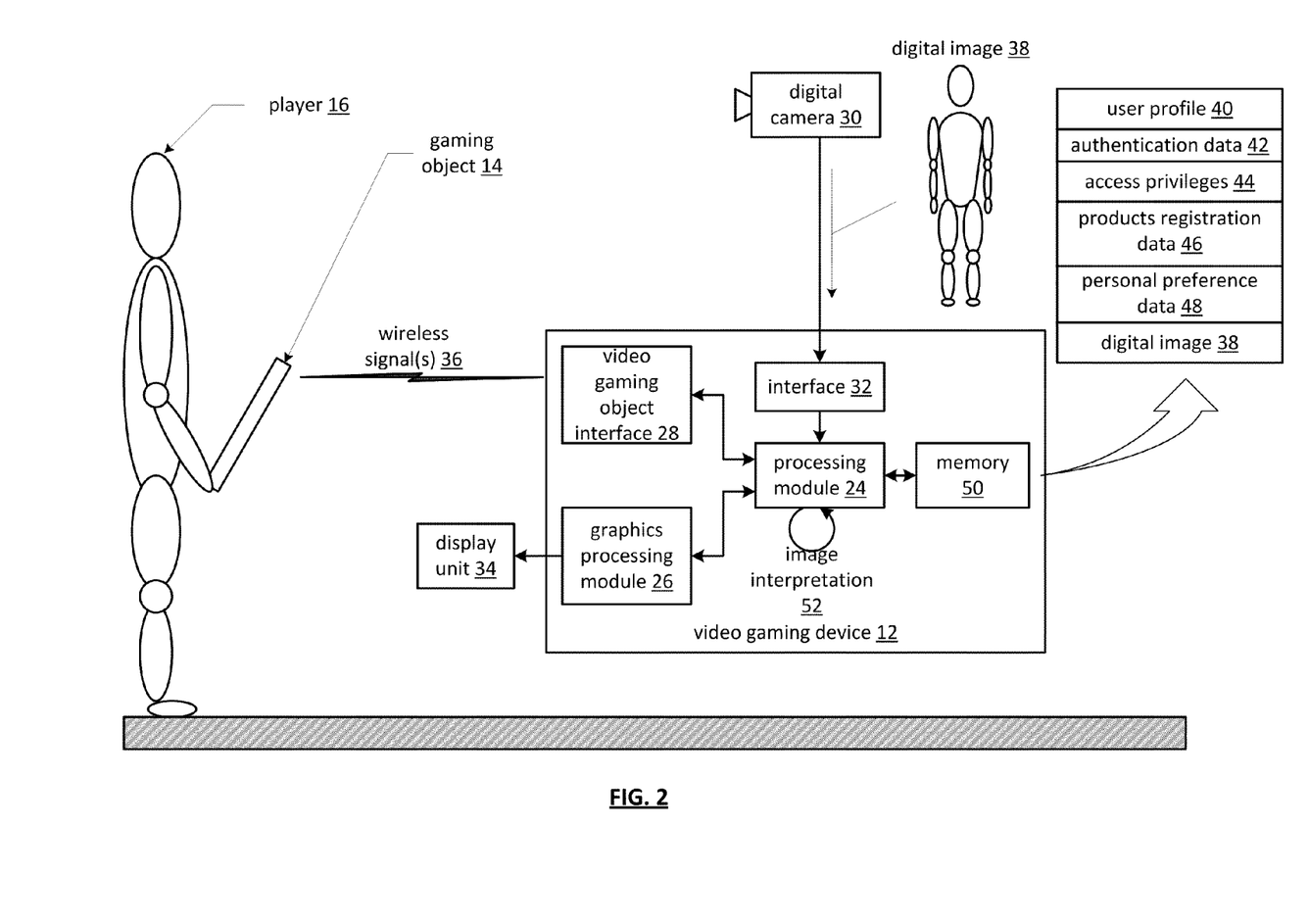
FIGS. 2-4 are diagrams of an example of video gaming in accordance with the present invention.

FIG. 2 is a diagram of an example of that expands on the video gaming system of FIG. 1. In this example, the digital camera 30 captures one or more digital images 38 of the player 16. The image 38 may be a full body image or a portion of the body (e.g., upper torso, headshot, etc.). The processing module 24 receives the digital image(s) 38 via the interface 32 and performs an image interpretation function 52 thereof to identify the player. The image interpretation function 52 may include analyzing the digital image(s) to isolate a face of the video game player; and once the face is isolated (e.g., the pixel coordinates of the player's face are determined), the processing module performs a facial recognition algorithm on the face to identify the video game player.

Once the player is identified, the processing module 24 retrieves the user profile 40 from memory 50 (which may be flash memory, random access memory, etc.). The user profile 40 includes authentication data 42, access privileges 44, product registration data 46, and personal preference data 48. The user profile 40 may further include a digital image 38 of the user's face to facilitate the facial recognition function.

The authentication data 42 may include information such as a password, user ID, device ID or other data for authenticating the player to the video game device 12 or to a service provided through the video game device 12. The video game device 12 may use the authentication data 42 to set access privileges 44 for the player in accordance with at least one video game it is executed. The access privileges 44 include an indication as to whether the player is a subscriber, or other authorized person, to play a video game, the age of the player to ensure that he or she is of a minimum age to play an age restricted video game, level of privilege to play a certain video game (e.g., play only, modify caricatures, save play, delete play, control other player's game play data, etc.) etc.

The product registration data 46 corresponds to data (e.g., serial number, date of purchase, purchaser's information, extended warranty, etc.) of the video game device 12, of purchased video games, of rented video games, of gaming objections, etc. Such product registration data 46 of peripheral components (e.g., gaming objects, which includes joy sticks, game controllers, laser pointers, microphones, speakers, headsets, etc.) and video game programs can be automatically be supplied to video game device 12 or to a service provider coupled thereto via a network. In this fashion, product information can be obtained each time a new game is initiated; a new component is added to the system; etc., without having to query the player for the data.

The personal preference data 48 includes security preferences or data (e.g., encryption settings, etc.), volume settings, graphics settings, experience levels, names, favorite video games, all video games in a personal library, favorite competitors, caricature selections, etc. that are either game parameters specific to a particular game or that are specific to the user's use of the video game device 12. The personal preference data 48 may also include billing information of the player to enable easy payment for on-line video game purchases, rentals, and/or play.

After retrieving the user profile 40, the processing module 24 generates video gaming menu data in accordance with at least one data element of the user profile. The example of FIG. 2 continues at FIG. 3 where the processing module 24 provides video gaming menu data 64 to the graphics processing module 26. The graphics processing module 26 converts the video gaming menu data 64 into a display image 66 of the video gaming menu, which is displayed on the display unit 34.

Figure 3:
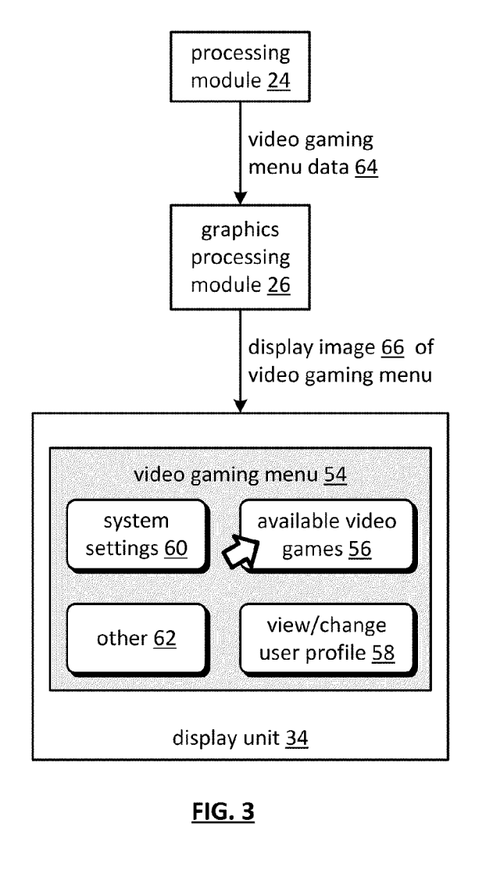
Figure 4:
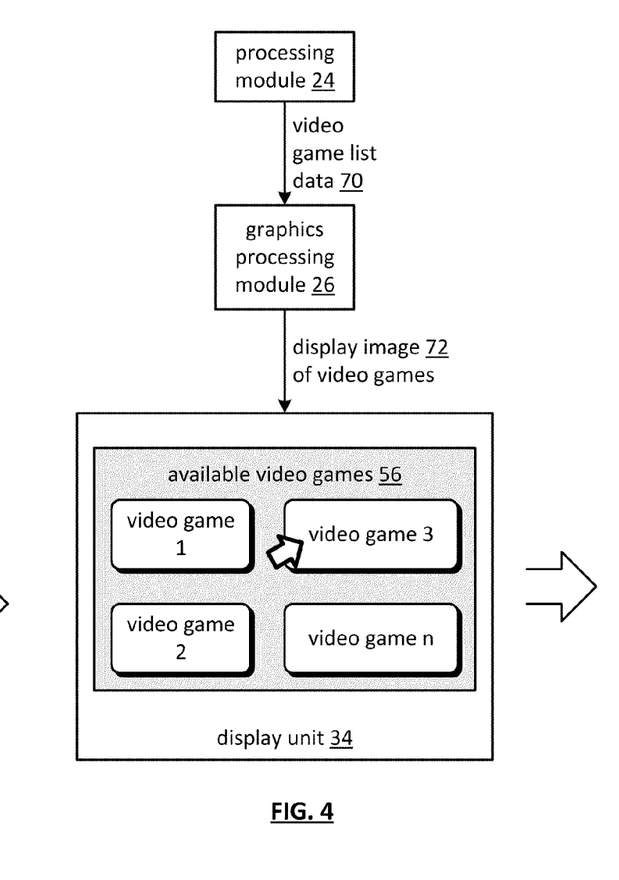

The video gaming menu data 64, and hence the resulting menu display 54, includes a composite of menu items that the player may most likely want to access or it may include a full listing of menu items available to the player. For example, the menu may include a listing of available video games, the user profile, and/or a listing of system settings (e.g., IP address, service provider information, video graphics processing settings (e.g., true color, 16 bit color, etc.), available memory, CPU data, etc.). In this example, the menu 54 includes system settings 60, available video games 56, view/change user profile 58, and may include other 62 options (e.g., play a DVD, active a web browser, play an audio file, etc.).

As is further shown in this example, the player has selected the menu item of available video games 56. The example continues at FIG. 4 where the processing module generates a list of video games 70 based on information contained in the user profile 40. The graphics processing module 26 converts the data of the list of video games 70 into a display image 72 of the available video games 56, which is displayed on the display unit 34.

In this example, the player provides a wireless menu selection signal 36 to the video gaming object interface module 28, which produces a menu selection signal therefrom. The processing module 24 interprets the menu selection signal to identify selection of one of the available video games 56 to produce a selected video game (as indicated by the arrow). The processing module 24 then retrieves operational instructions of the selected video game and begins executing the operational instructions to facilitate playing of the selected video game as shown in FIG. 5.

Figure 5:
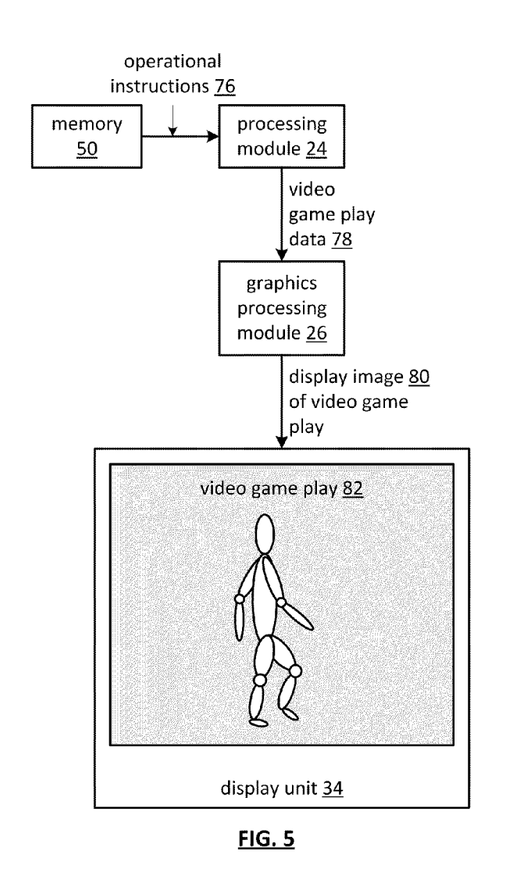
FIG. 5 is a diagram of another example of video gaming in accordance with the present invention.

FIG. 5 is a diagram of another example of video gaming where the processing module 24 is retrieving operational instructions 76 from memory 50 for a selected video game. The operational instructions 76 may be in source code, object code, assembly language, etc., that are executable by the processing module 24. In this example, as the processing module 24 is executing the operational instructions 76, it generates video game play data 78, which it provides to the graphics processing module 26. The video game play data 78 may include information to enable the graphics processing module 26 to perform calculations for three-dimensional graphics, to perform geometric calculations for rotation, to translate vertices into different coordinate systems, perform shading for manipulating vertices and textures, perform anti-aliasing, perform motion compensation, and/or perform color space processing to produce the display image 80 of the video game play.

During the execution of the operational instructions 76 of the selected video game, the processing module 24 may encounter operational instructions regarding the rendering a graphical representation of a caricature. In this instance, the example continues at FIG. 6 where the processing module 24 identifies operational instructions corresponding to rendering graphics of a caricature of the selected video game. Having identified the operational instructions, the processing module 24 alters the rendering of the graphics of the caricature based on the at least one digital image.

Figure 6:
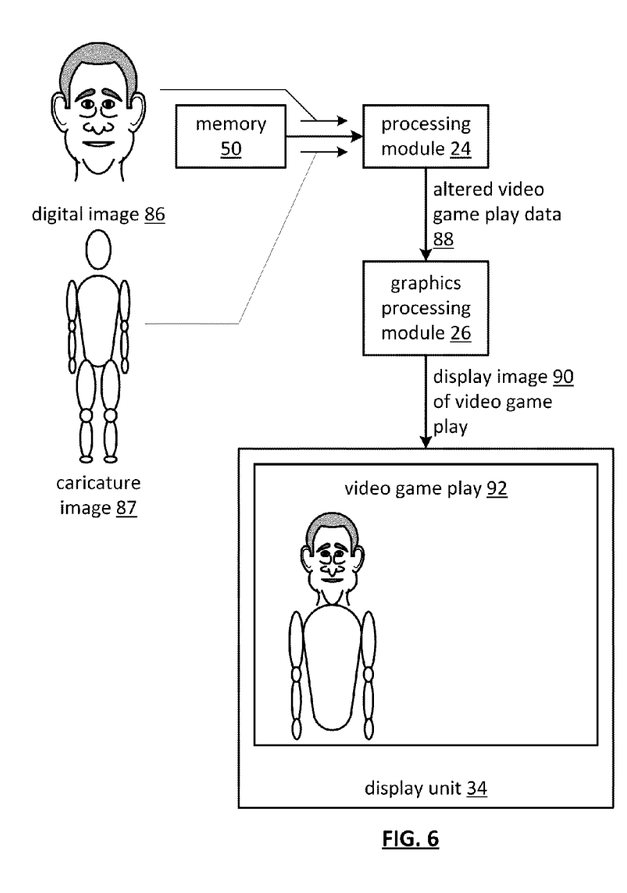
FIG. 6 is a diagram of another example of video gaming in accordance with the present invention.

For example, while executing the operational instructions regarding rendering an image 87 of a caricature, the processing module 24 retrieves the digital image 86 of the player 16 and may further retrieve the caricature image data 87. During the execution of these operational instructions, the processing module alters the video game play data by using the digital image 86 of the player in place of the digital image 87 of the caricature or by combining the images 86 and 87. Further, the processing module 24 may modify the image 86 of the player to create a caricature of the player, which it uses when executing the operational instructions.

The processing module 24 provides the altered video game play data 88 to the graphics processing module 26, which generates, therefrom, display image 90 of the video game play. The resulting video game play image 92, which typically includes a series of images to produce a motion picture, is displayed on the display unit 34.

Figure 7:
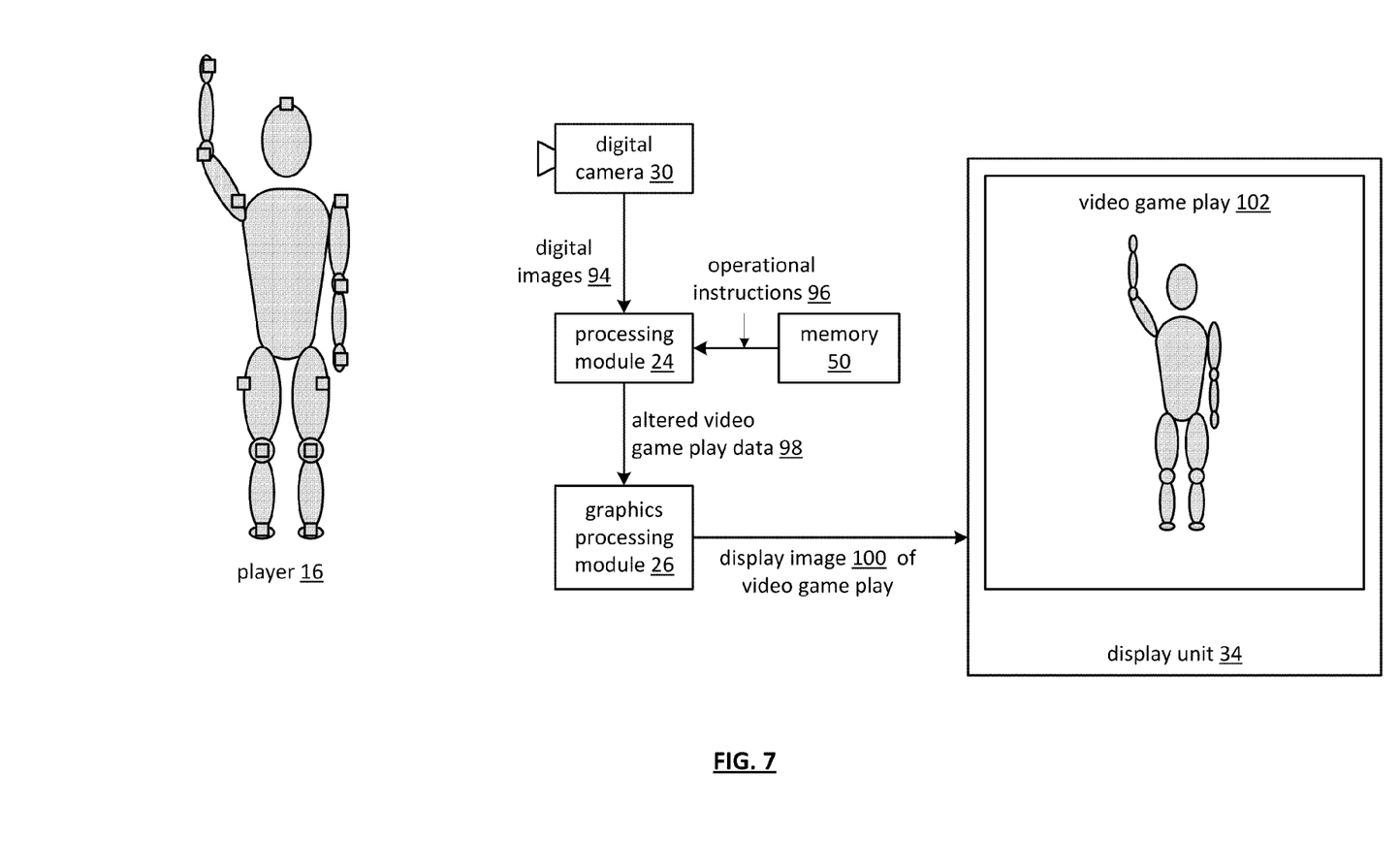
FIG. 7 is a diagram of another example of video gaming in accordance with the present invention.

FIG. 7 is a diagram of another example of video gaming where the digital camera 30 captures a plurality of images 94 of the player 16. In this example, the processing module 24 receives the additional digital images 94 of the video game player as it is executing operational instructions 96. The processing module 24 interprets the additional digital images 94 to identify gaming expressions (e.g., facial expressions, gestures, etc.). The processing module 24 alters the executing of the operation instructions 96 based on the gaming expressions to produce altered video game play data 98.

The processing module 24 provides the altered video game play data 98 to the graphics processing module 26, which generates, therefrom, display image 100 of the video game play. The resulting video game play image 102, which typically includes a series of images to produce a motion picture, is displayed on the display unit 34.

Figure 8:
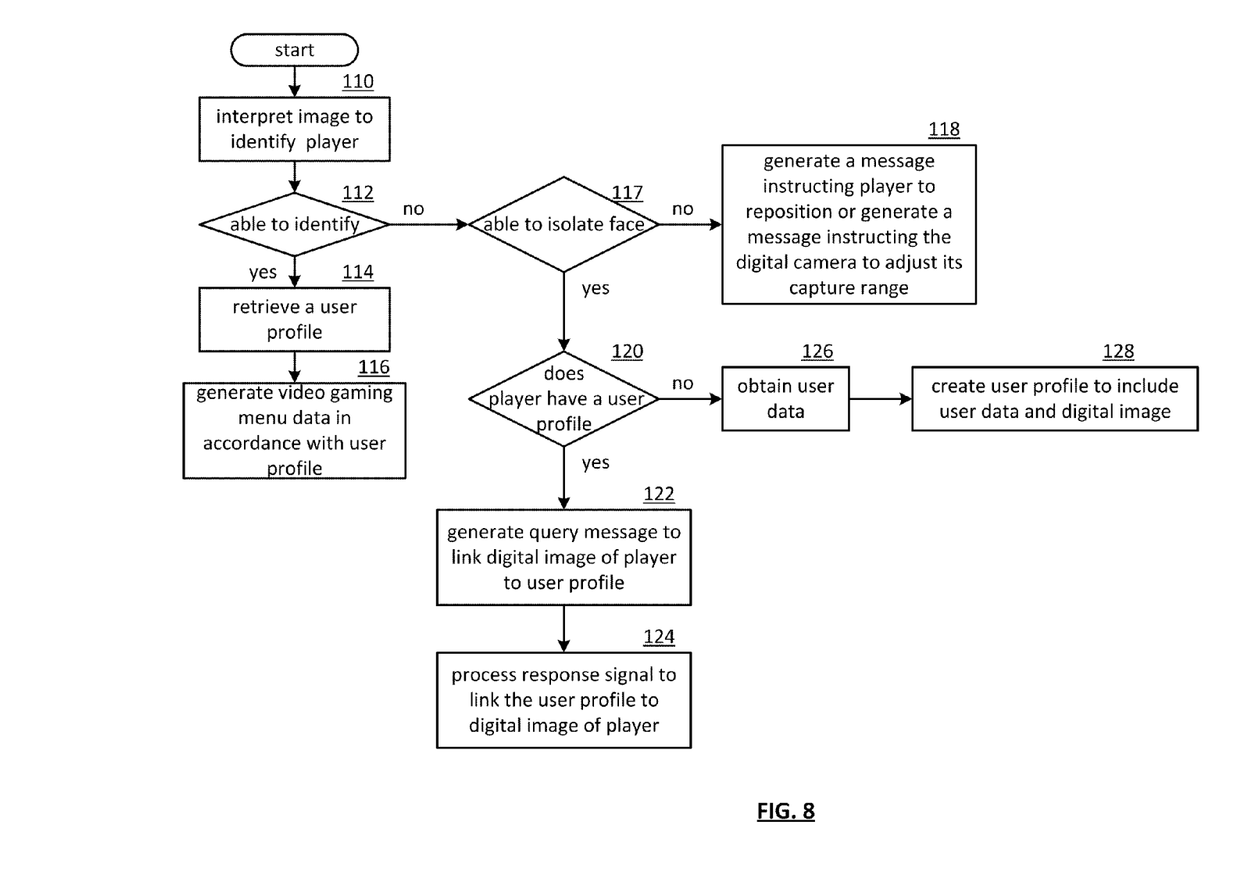
FIG. 8 is a logic diagram of an embodiment of a method for video gaming in accordance with the present invention.

FIG. 8 is a logic diagram of an embodiment of a method for video gaming that begins at step 110 where the processing module interprets at least one digital image of the video game player to determine an identity of the video game player. In an embodiment, this may be done by analyzing the at least one digital image to isolate a face of the video game player and performing a facial recognition algorithm on the face to identify the video game player.

The method continues at step 112 where the processing module determines whether it was able to identify the player. If yes, the method continues at step 114 where the processing module retrieves a user profile of the video game player. An example of this was discussed with reference to FIG. 2. The method continues at step 116 where the processing module generates video gaming menu data in accordance with at least one data element of the user profile. An example of this was discussed with reference to FIG. 3.

If the processing module was not able to identify the player at step 112, the method continues at step 117, where the processing module determines whether it was able to isolate a face in the digital image(s). If not, the method continues at step 118 where the processing module generates a message instructing the video game player to reposition him or herself. The message is provided to the graphics processing module for subsequent presentation on the display unit 34. In this instance, the images being captured by the digital camera may be processed and provided to the display unit such that the player can position him or herself to achieve a desired digital image. Alternatively or in addition to, the processing module may generate another message instructing the digital camera to adjust its capture range to zoom in on a head of the video game player and to capture another digital image.

If, at step 117, the processing module was able to isolate a face, the method continues at step 120 where the processing module determines whether the player has a user profile. In this instance, the player has provided sufficient information to identify him or herself, but is either new to the video game device 12 or does not have his or her digital image linked to his or her user profile. When it is the former, the method continues at step 126 where the processing module obtains user data (e.g., authentication data, personal preferences, etc.). The method continues at step 128 where the processing module creates the user profile to include the user data and the at least one stored digital image.

If, at step 120, the player has a user profile but it is not linked to his or her digital image, the method continues at step 122 where the processing module generates a query message regarding whether the video game player would like to establish the user profile linked to a digital image of the video game player. The message is provided to the graphics processing module, which create a display image of the message for presentation on the display unit. When the player affirmatively response, the method continues at step 124 where the processing module links the digital image of the player to his or her user profile. This may be done by storing a digital image of the video game player to produce at least one stored digital image and adding the digital image to the user profile to establish the link between the user profile and the digital image of the video game player.

Figure 9:
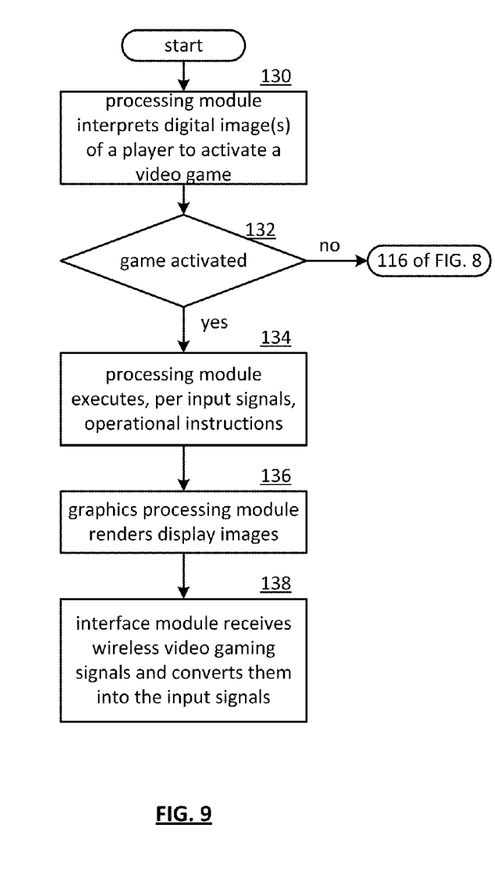
FIG. 9 is a logic diagram of another embodiment of a method for video gaming in accordance with the present invention.

FIG. 9 is a logic diagram of another embodiment of a method for video gaming that begins at step 130 where the processing module interprets at least one of a plurality of digital images of a video game player to activate a video game. In an embodiment, the processing module may active a video game by identifying the video game player based on the at least one of a plurality of digital images; retrieving a user profile based on the identity of the video game player; and activating the video game in accordance with the user profile.

If the game cannot be activated, the method branches from step 132 to steps 116-128 of FIG. 8 to link a digital image to a player. If the game is activated, the method continues at step 134 where the processing module executes, in accordance with video gaming input signals, operational instructions of the video game incorporating at least some of the plurality of digital images to produce video gaming data. Examples of this were discussed in FIGS. 2-7.

The method continues at step 136 where the graphics processing module renders display images based on the video gaming data. Examples of this were also provided with reference to FIGS. 2-7. The method continues at step 138 where the video gaming object interface receives wireless video gaming signals and converts them into the video gaming input signals.

Figure 10:
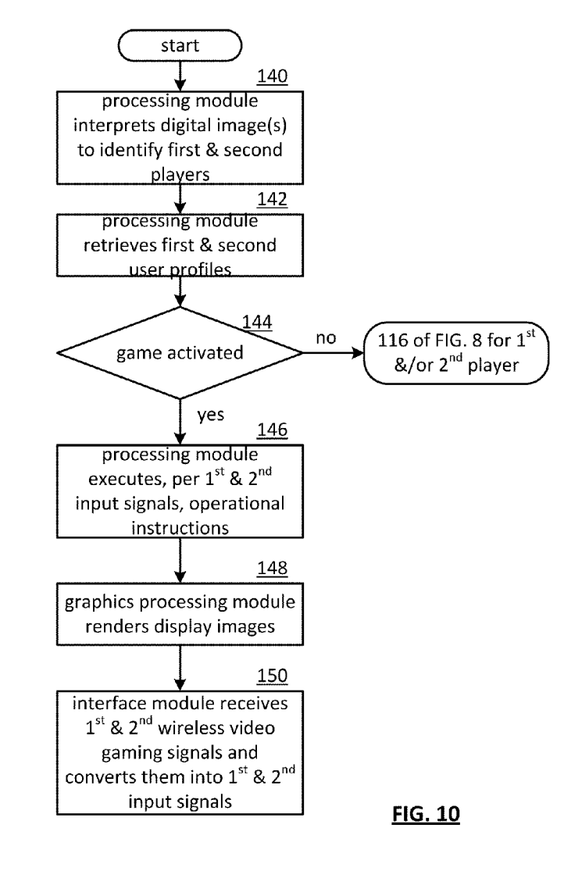
FIG. 10 is a logic diagram of another embodiment of a method for video gaming in accordance with the present invention.

FIG. 10 is a logic diagram of another embodiment of a method for video gaming that begins at step 140 where the processing module interpret at least one of a plurality of digital images to identify a first video game player and to identify a second video game player. In this instance, multiple players are proximally located to the video game device and, as such, the processing module analyzes the at least one of a plurality of digital images to isolate a face of the first and/or second video game player. The processing module then performs a facial recognition algorithm on the face to identify the first and/or second video game player. Note that the digital images may be received from one or more digital cameras. For example, a first digital camera may be used to capture images of the first player and a second digital camera may be used to capture images of the second player.

The method continues at step 142 where the processing module attempts to retrieve a first user profile for the first video game player based on the identity of the first video game player and attempts to retrieve a second user profile for the second video game player based on the identity of the second video game player. The method continues at step 144 where the processing module determines whether it can activate a video game. A video game can be activated if both players can be identified by their respective digital images, they have user profiles, and the user profiles indicate a particular game or one of the players has indicated which game to play. If the game cannot be activated, the method branches to steps 116-128 of FIG. 8 to link a digital image to a player for the first and/or second player.

When the game can be activated, the method continues at step 146 where the processing module executes, in accordance with first and second video gaming input signals, operational instructions of the video game incorporating at least some of the plurality of digital images to produce video gaming data. Examples of executing operational instructions for a single player have been provided with reference to FIGS. 2-7. These examples are applicable to multiple players processing of video game operational instructions.

For example, the processing module may execute the operation instructions by identifying a set of operational instructions corresponding to rendering graphics of a first or second caricature of the video game. When the set of operational instructions corresponding to rendering the graphics of the first or second caricature are to be executed, the processing module alters the rendering of the graphics of the first or second caricature based on one or more of the plurality of digital images. For instance, the graphics of the first caricature is altered based on an image of the first video game player in the one or more of the plurality of digital images and the graphics of the second caricature is altered based on an image of the second game player in the one or more of the plurality of digital images.

As another example, the processing module may execute the operation instructions by interpreting the plurality of digital images to identify gaming expressions of at least one of the first and second video game players. The processing module then alters the executing of the operation instructions based on the gaming expressions.

The method continues at step 148 where the graphics processing module renders display images based on the video gaming data. The method continues at step 150 where the video gaming object interface module receives first and second wireless video gaming signals and converts the first and second wireless video gaming signals into the first and second video gaming input signals, where the first video gaming input signals correspond to the first video game player and the second video gaming input signals correspond to the second video game player.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A video gaming device comprises:
    a processing module including a processor and executable operational instructions, the processing module configured to:
        interpret at least one digital image of the video game player to determine an identity of the video game player;
        when the identity of the video game player is determined from the at least one digital image, retrieve a user profile of the video game player, the user profile including a caricature based upon the at least one digital image of the video game player; and
        generate video gaming menu data in accordance with at least one data element of the user profile; and
    a graphics processing module configured to render a display image based on the video gaming menu; and
    a video gaming object interface module configured to:
        receive a wireless menu selection signal; and
        convert the wireless menu selection signal into a menu selection signal,
    wherein when the identity of the video game player cannot be determined from the at least one digital image:
        the processing module is further configured to generate a query message regarding whether the video game player would like to establish the user profile linked to a digital image of the video game player;
        the graphics processing module is further configured to render a second display image based on the query message;
        the video gaming object interface module is further configured to:
            receive a wireless response signal; and
            convert the wireless response signal into a response signal; and
        the processing module is further configured to:
            process the response signal to link the user profile to the digital image of the video game player.

2. The video gaming device of claim 1, wherein the processing module is further configured to interpret the at least one digital image by:
    analyzing the at least one digital image to isolate a face of the video game player; and
    performing a facial recognition algorithm on the face to identify the video game player.

3. The video gaming device of claim 2, wherein the processing module is further configured to perform at least one of:
    when the analyzing of the at least one digital image cannot isolate the face, generating a message instructing the video game player to reposition himself or herself; and
    when the analyzing of the at least one digital image cannot isolate the face, generating a second message instructing the digital camera to adjust its capture range to zoom in on a head of the video game player and to capture another digital image.

4. The video gaming device of claim 1, wherein the processing module processes the response signal by:
    determining whether the video game player has an existing user profile;
    when the video game player has the existing user profile:
        storing the at least one digital image of the video game player to produce at least one stored digital image; and
        adding the at least one stored digital image to the user profile to establish the link between the user profile and the digital image of the video game player; and
    when the video game player does not have an existing user profile:
        obtaining user data; and
        creating the user profile to include the user data and the at least one stored digital image.

5. The video gaming device of claim 1, wherein the user profile comprises at least one of:
    authentication data;
    access privileges;
    product registration data; and
    personal preference data.

6. The video gaming device of claim 1, wherein the processing module generates the video menu to comprise at least one of:

a listing of available video games;
the user profile; and
a listing of system settings.

7. The video gaming device of claim 6, wherein the processing module is further configured to:
   interpret the menu selection signal to identify selection of one of the available video games to produce a selected video game;
   retrieve operational instructions of the selected video game; and
   execute the operational instructions to facilitate playing of the selected video game.

8. The video gaming device of claim 7, wherein the processing module executes the operation instructions by:
   identifying operational instructions corresponding to rendering graphics of the caricature based upon the selected video game; and
   when the operational instructions corresponding to rendering the graphics of the caricature are to be executed, altering the rendering of the graphics of the caricature based on the at least one digital image.

9. The video gaming device of claim 7, wherein the processing module executes the operation instructions by:
   receiving additional digital images of the video game player;
   interpreting the additional digital images to identify gaming expressions; and
   altering the executing of the operation instructions based on the gaming expressions.

10. The video gaming device of claim 1 further comprises:
    a digital camera operable to capture the at least one digital image of the video game player.

* * * * *